Patented Feb. 20, 1934

1,948,343

UNITED STATES PATENT OFFICE

1,948,343

CONDENSATION PROCESS YIELDING CONDENSATION PRODUCTS OF THE UREA FORMALDEHYDE TYPE

Karl Eisenmann, Ludwigshafen-on-the-Rhine, and Theodor Kollmann, Mannheim, Germany, assignors, by mesne assignments, to Unyte Corporation, New York, N. Y., a corporation of Delaware No Drawing. Application February 28, 1931, Serial No. 519,252, and in Germany March 27, 1930

7 Claims. (Cl. 260—3)

The present invention relates to a condensation process yielding condensation products of the urea formaldehyde type.

We have found that condensation products which are valuable industrially are obtained by dissolving or suspending water-soluble mixture of compounds of the urea type and of compounds of the formaldehyde type, i. e. urea or thiourea, or their derivatives, and aldehydes, especially formaldehyde or its polymers, or the corresponding mono- or di-methylol compounds or the anhydrides obtainable therefrom by splitting off water, or mixtures of the said substances, in a substantial quantity of practically anhydrous organic solvents containing hydroxyl groups such as mono- or poly-valent aliphatic or aromatic alcohols, as for example ethyl, isobutyl, n-butyl, amyl or benzyl alcohol ethylene glycol or glycerine, with an addition of from 10 to 30 per cent, by weight of the urea-formaldehyde combination of inorganic substances which remove water, as for example anhydrous calcium chloride or nitrate, anhydrous zinc chloride, phosphorus pentoxide, quicklime and the like, the solutions or suspensions being heated, if desired at a pressure above atmospheric pressure. When solvents boiling below 100° C. are used, the heating is effected by boiling the solution or suspension. When using solvents of higher boiling point, the temperatures at which the heating is carried out, should not exceed 150° C. and should preferably range between 100° and 110° C. Since in this range of temperatures the reaction proceeds in a particularly favourable manner, it may be advantageous when using solvents of low boiling point, to effect the heating in a closed vessel, whereby pressure is set up. It is very advantageous to employ anhydrous calcium chloride or other neutral water-removing agents, since when using these the reaction proceeds in a neutral medium, so that it is readily possible to interrupt the reaction when any desired degree of condensation has been attained. In any case the quantity of solvent employed is so high, that the reaction components are largely dispersed and no fusion occurs on heating. Thus for example the solvent, say butanol, is employed in a quantity of about ½ that of the urea, say dimethylol urea, or, preferably, in higher quantities.

On working in accordance with the present invention water formed during the reaction is immediately removed and a completely anhydrous solution is obtained.

The following examples will further illustrate the nature of this invention, but the invention is not restricted to these examples. The parts are by weight.

Example 1

200 parts of di-methylol urea and 300 parts of normal butyl alcohol are stirred for 1½ hours at 102° C. with an addition of 30 parts of neutral anhydrous calcium chloride. The di-methylol urea is completely dissolved after about 15 minutes.

After the calcium chloride has been removed from the solution by shaking or stirring the solution with sodium sulphate and subsequent filtration, the solution may be employed directly as a varnish. The condensation product may be obtained in a solid form by removing the solvent by steam distillation or by precipitation, as for example with ethyl ether, and the solid condensation product may be moulded under mechanical pressure while heating or may be worked up into a lacquer.

Example 2

60 parts of trioxymethylene are dissolved in 300 parts of iso-butanol together with 5 parts of N/2 alcoholic caustic potash and the mixture is then neutralized with N/2 alcoholic hydrochloric acid. 30 parts each of urea and of anhydrous calcium chloride are then added and the whole is stirred for one hour at 105° C. After removal of the calcium chloride the solution obtained may be directly employed as a varnish or it may be worked into a solid resin as described in Example 1.

Example 3

150 parts of dimethylolurea and 50 parts of dimethylolthiourea are suspended in 250 parts of benzyl alcohol. The mixture is heated to 110° C., while stirring, with 36 grams of anhydrous calcium nitrate and kept at this temperature for 2 hours. After removing the calcium nitrate, a clear solution is obtained which can be worked up with nitrocellulose into a lacquer giving coatings of particularly high lustre. Instead of the calcium nitrate, 20 parts of anhydrous zinc chloride may be employed.

What we claim is:—

1. In the production of a resinous product selected from the class consisting of urea-aldehyde resinous products and thiourea-aldehyde resinous products by the condensation of water-soluble initial materials in the presence of a substantially anhydrous alcohol, the step of carrying out the condensation in the presence of an inert inorganic dehydrating agent.

2. In the production of a resinous product selected from the class consisting of urea-aldehyde resinous products and thiourea-aldehyde resinous products by heating a neutral dispersion of water-soluble initial materials in a substantially anhydrous aliphatic alcohol, the step of carrying out the condensation in the presence of an inert inorganic dehydrating agent.

3. In the production of urea-aldehyde resinous products by condensing dimethylol urea in the presence of a substantially anhydrous alcohol, the step of carrying out the condensation in the presence of an inert inorganic dehydrating agent.

4. In the production of a thiourea-aldehyde resinous product by condensing dimethylol urea and dimethylol thiourea in the presence of a substantially anhydrous alcohol, the step of carrying out the condensation in the presence of an inert inorganic dehydrating agent.

5. In the process of producing a resinous condensation product selected from the class consisting of urea aldehyde resinous products and thiourea aldehyde resinous products by heating a neutral dispersion of water-soluble initial materials in the presence of a substantially anhydrous aliphatic alcohol, the step of carrying out the condensation in the presence of anhydrous calcium chloride.

6. In the process of producing a resinous condensation product from dimethylol urea by heating in the presence of substantially anhydrous n-butyl alcohol, the step of carrying out the condensation in the presence of anhydrous calcium chloride.

7. In the production of condensation products by heating dimethylolurea in the presence of n-butyl alcohol, the step which comprises carrying out the reaction in the presence of anhydrous calcium chloride.

KARL EISENMANN.
THEODOR KOLLMANN.